G. KROGEL.
SAFETY APPLIANCE FOR AEROPLANES.
APPLICATION FILED SEPT. 7, 1917.
1,251,896.
Patented Jan. 1, 1918.
4 SHEETS—SHEET 3.
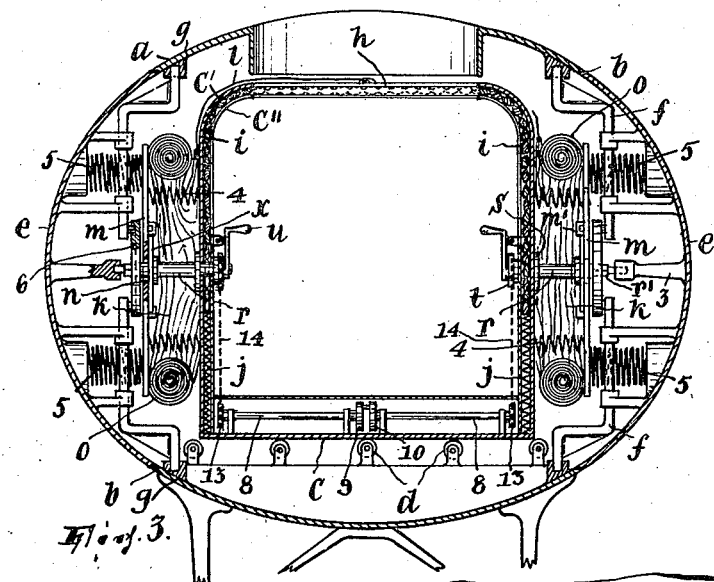
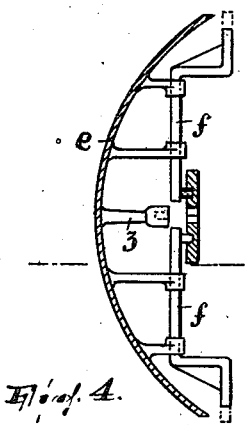
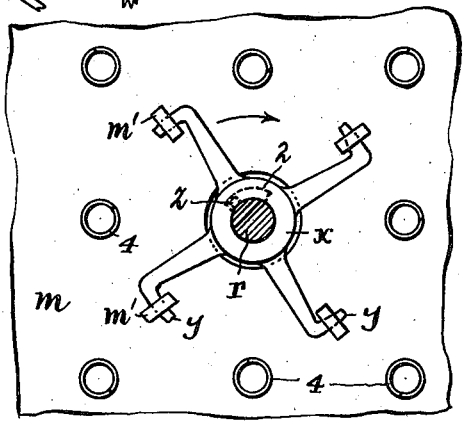
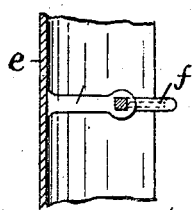
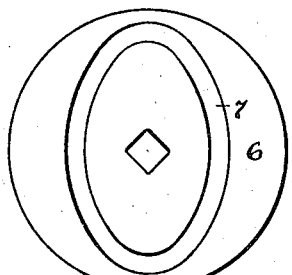
WITNESS
Wm D Bell
INVENTOR,
Gustave Krogel,
BY
John Steward,
ATTORNEY.

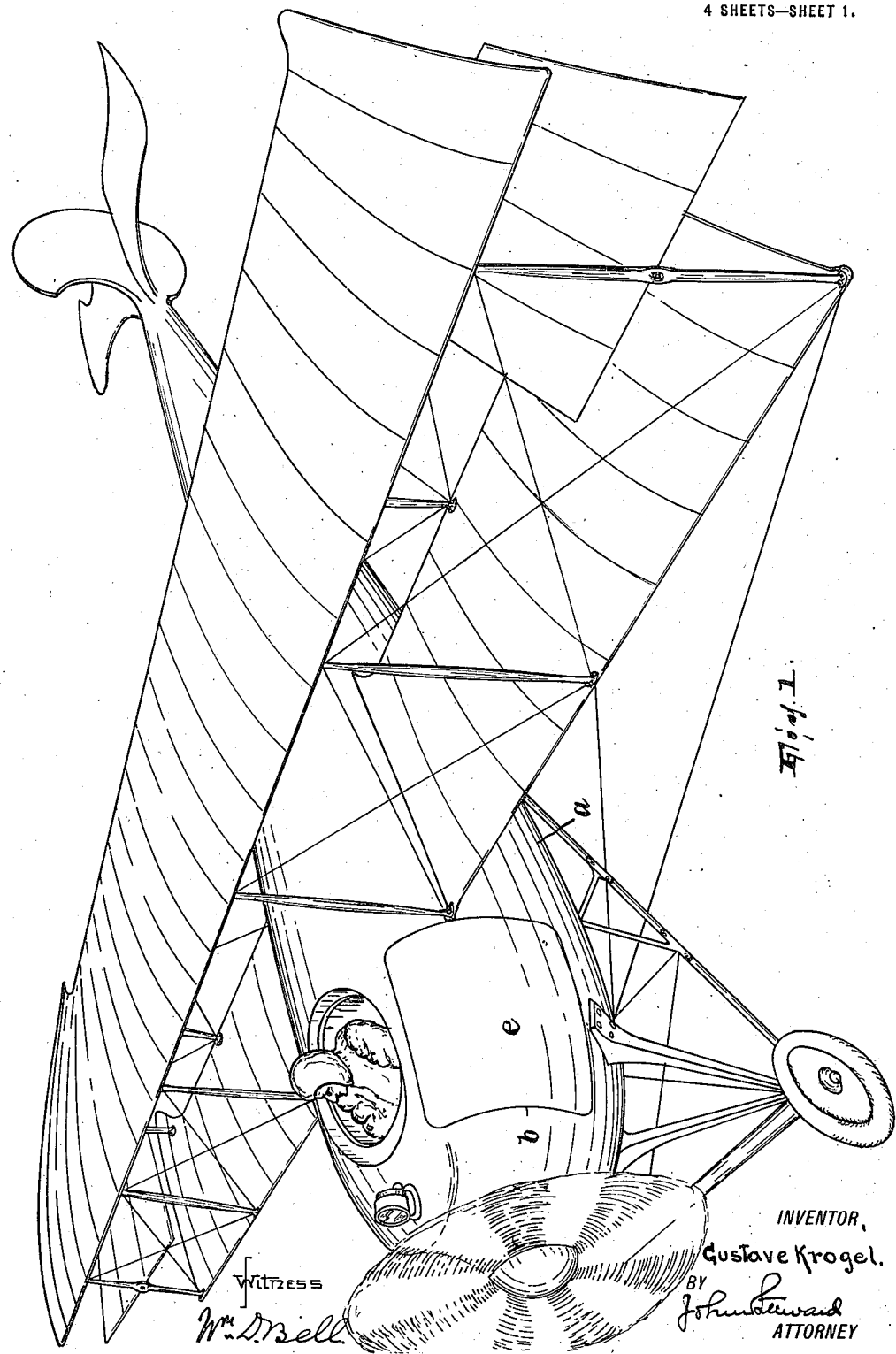

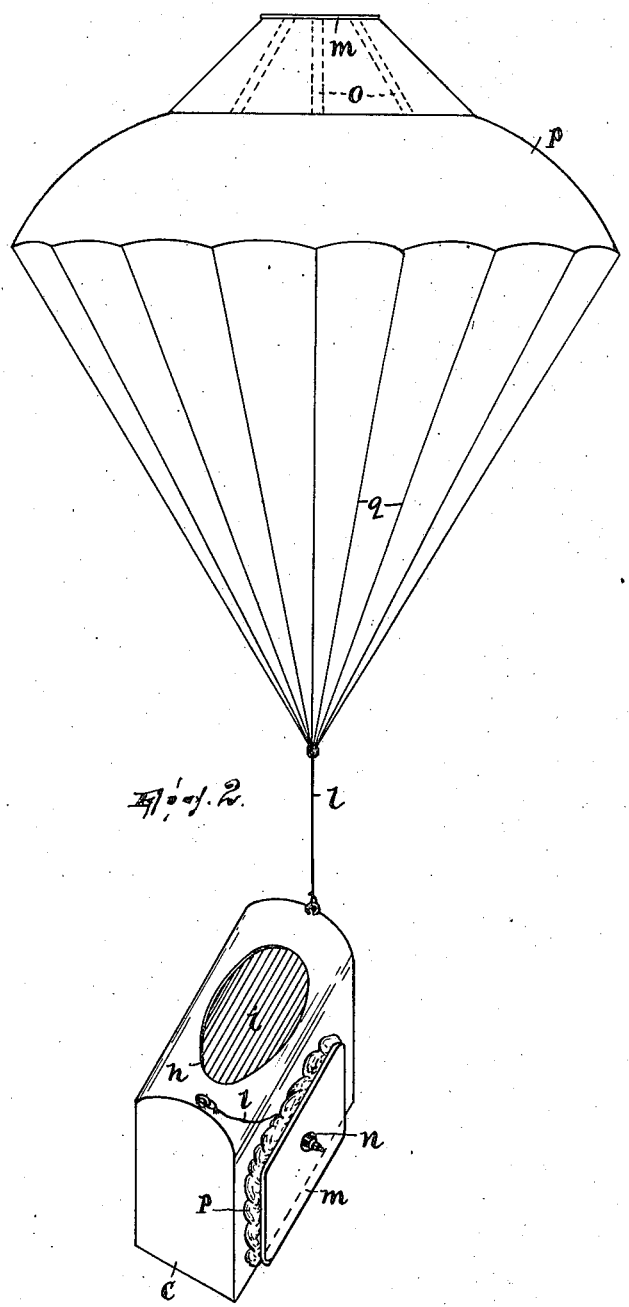

G. KROGEL.
SAFETY APPLIANCE FOR AEROPLANES.
APPLICATION FILED SEPT. 7, 1917.
1,251,896.
Patented Jan. 1, 1918.
4 SHEETS—SHEET 4.
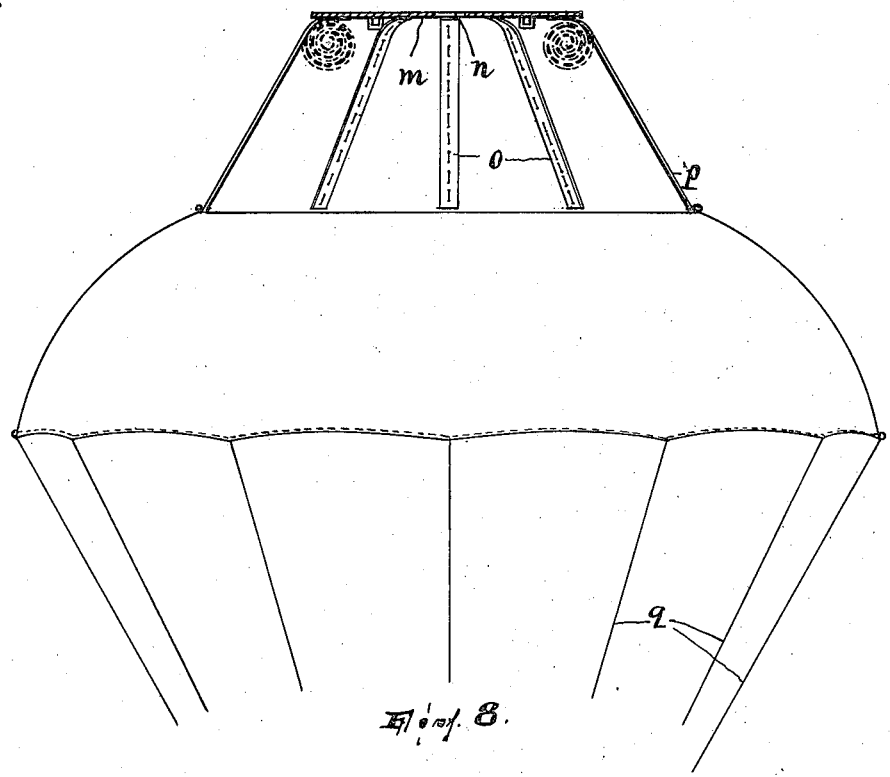
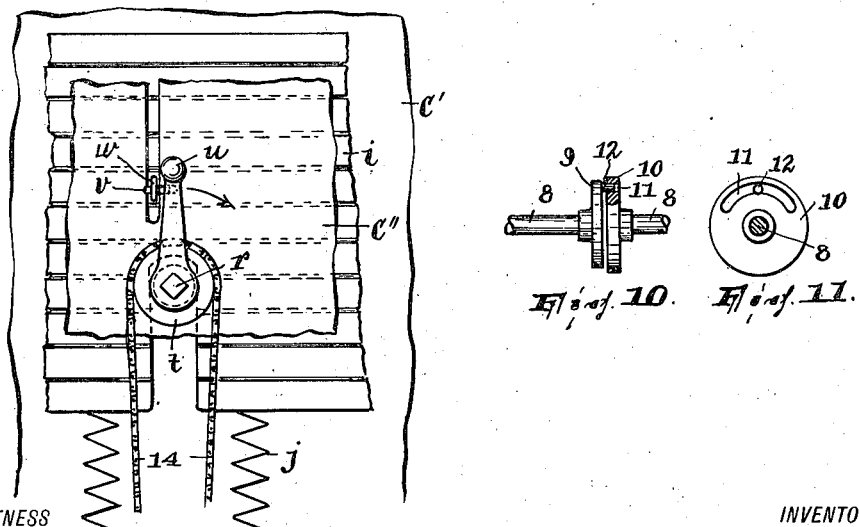
WITNESS
INVENTOR,
Gustave Krogel.
BY
ATTORNEY.

UNITED STATES PATENT OFFICE.

GUSTAVE KROGEL, OF PATERSON, NEW JERSEY.

SAFETY APPLIANCE FOR AEROPLANES.

1,251,896.        Specification of Letters Patent.        Patented Jan. 1, 1918.

Application filed September 7, 1917. Serial No. 190,156.

*To all whom it may concern:*

Be it known that I, GUSTAVE KROGEL, a citizen of the United States, residing at Paterson, in the county of Passaic and State of New Jersey, have invented certain new and useful Improvements in Safety Appliances for Aerial Machines, of which the following is a specification.

The object of this invention is to provide an aerial machine, as an aeroplane, with means whereby to forcibly deliver the occupant clear of the machine and so that his fall will be eased by a parachute or parachutes in case he loses control of the machine and is in danger of being drawn down with it as it falls. At present, in case an aeroplane starts to fall the occupant has little opportunity to save himself by using a parachute because the chances are greatly against his being able to jump with the parachute clear of the spreading wings and other parts of the machine before the parachute would be caught and its successful opening prevented thereby. My invention, as indicated, contemplates means to forcibly eject the occupant, such as releasable springs or equivalent means, and to this end I preferably provide the fuselage of the machine with an ejectible car to which the parachute or parachutes are attached and which the aviator occupies and is the element driven out by the spring or equivalent means; in the preferred construction this car is arranged to be ejected laterally from the fuselage in either of two opposite directions, and it has a cover or door whereby to close the opening through which the occupant's body projects upwardly while driving the machine (so that when the car is ejected the occupant will be perfectly housed within the car and therefore safe against being thrown out) and contains the devices whereby the ejection of the car, the closing of said cover or door and other operations are controlled; further, in the preferred construction there are two parachutes, one on each side of the car, and the construction and arrangement are such that the parachutes are retained from opening out until the car has cleared the fuselage of the machine, thus to prevent interference with the fuselage and damage to the parachutes. The parachutes themselves are preferably packed in compact form but so as to open out readily automatically when released from their packed state, and to insure their opening out I provide them with radial spring ribs each normally adapted to extend but capable of being rolled toward its inner end into a helix.

Describing, now, my invention in detail as herein shown by way of example, and referring, first, to the accompanying drawings, wherein, Figure 1 is a perspective view of an aeroplane constructed in accordance with my invention;

Fig. 2 is a similar view, showing the car delivered from the fuselage and having its fall resisted by one of the parachutes, the other of which appears as yet unreleased;

Fig. 3 is a transverse sectional view through the fuselage and car;

Fig. 4 is a transverse sectional view of one of the closures for the two opposite openings of the fuselage through which the car may be ejected;

Fig. 5 is an inside fragmentary plan of one of the plates for retaining the parachutes in compact form and of its locking means, one of the two operating shafts being shown in section;

Fig. 6 is a horizontal section of the closure shown in Fig. 4;

Fig. 7 is an outside elevation of a certain cam;

Fig. 8 shows, in section, one of the parachutes extended;

Fig. 9 is an inside elevation of one side of the car, one of the doors for closing its opening and one of the operating means; and Figs. 10 and 11 show a certain lost-motion connection between the two operating means.

*a* is the fuselage of the aeroplane. It is provided at both sides with openings *b*, arranged opposite each other, and it contains a car *c* for the occupant arranged on rollers or other guides *d* and adapted to pass through either opening.

There is a closure *e* for each opening, which may be a cut-out part of the shell of the fuselage, and each of the closures is provided with opposite sliding bolts *f* adapted to engage in keepers *g* on the fuselage to releasably hold the closures in the closing position.

The car is closed on all sides, excepting for an opening *h* at the top through which the occupant's body projects upwardly in order to afford vision in operating the aeroplane. This opening may be closed, on the car being ejected from the fuselage, by any suitable means, that shown in the drawings consisting of two flexible doors $i$ arranged one at each side of the car and between the walls $c'$ $c''$ of the car and subject to the closing action of springs $j$; means are provided (to be described) for holding each door retracted in the full-line position shown in Fig. 3, the same being adapted to release one door or the other so that it will be advanced by its springs $j$ to meet the other door and so close the opening $h$.

In the illustrated construction there are two parachutes, $k$ $k$, each attached by a rope or the like $l$ to the car. Each parachute has a top-plate $m$ with a central vent $n$, radial spring ribs $o$ secured to said plate and each capable of being rolled toward its inner end into the form of a helix, as shown in Fig. 3, the plate and ribs forming an extensible parachute frame, a parachute cover $p$ of flexible material, and guys $q$ or the like attached to the cover and having the rope $l$ secured thereto. The spring ribs being rolled up and the covers folded into compact form, the parachutes are adapted to be packed on opposite sides of the car between the latter and the closures $e$, their top-plate $m$ being outward and parallel with the sides of the car.

In each side of the car there is journaled a shaft $r$ held from endwise motion by the collar $s$ and sprocket wheel $t$, arranged one outside of and the other within the side wall of the car; the shaft has within the car a crank $u$. The shaft carries a hook $v$ to engage an eye $w$ on the corresponding door $i$, which eye may move in a slot in the inner side wall $c''$ (Fig. 9); when the hook is engaged with the eye the door is held down against the tension of its springs $j$. The shaft is adapted to project through the vent $n$ of the parachute top-plate $m$ when the parachute is packed away as shown in Fig. 3, and to releasably hold the top-plate from movement away from the side of the car there is a spider $x$ whose arms have hooks $y$ adapted to engage in eyes $m'$ on the top plate, the spider being arranged on the shaft $r$ and held from outward movement thereon by the pin $z$ (Fig. 5). The spider is adapted to be turned by the crank, but some lost motion is permitted by virtue of the pin $z$ being received in a segmental notch 2 in the spider, for a reason to be explained. Each shaft $r$ may have its outer end journaled in a suitable bearing 3 afforded by the closure $e$.

4 designates compressed spiral springs interposed between the sides of the car and the top-plates $m$ of the parachutes and adapted to force the top-plates away from the car when released, thus to insure proper opening of the parachutes.

Between each closure $e$ and the top plate of the adjoining parachute are arranged a set of powerful springs 5 which are in a state of compression. Upon either closure being released, as by withdrawing its bolts, the same will by these springs be first driven away from the car and then the springs at the relatively opposite side of the car will drive the latter out of the fuselage through the opening uncovered by the said closure.

The withdrawal of the bolts $f$ of each closure may be effected by a cam 6 on each shaft $r$, which has a squared portion $r'$ to receive the cam and allow it to slip off the shaft endwise; each cam has a groove 7 in its outer face adapted to receive suitable studs on the bolts.

At the bottom of the car is journaled a pair of horizontal alined shafts 8 8 having lost-motion connection with each other afforded by two disks 9, 10, one of which has an arc-shaped slot 11 and the other a pin 12 engaged in said slot; normally the pin stands about midway of the length of the slot, the purpose of which will be explained. Each shaft has a sprocket wheel 13 and extending around such sprocket wheel and the sprocket wheel on the corresponding shaft $r$ is a chain 14.

The operation is as follows: The parts being arranged as shown in Fig. 3 and as already described, when the aeroplane starts to fall the occupant grasps and turns one of the cranks $u$; the natural impulse will be to grasp the crank which happens to be at the higher side of the car. The hook $v$ is so constructed and arranged that the turning of shaft $r$ first results in withdrawing said hook from the eye $w$ of the corresponding door $i$, which being released closes the opening in the top of the car so that there will be no danger when the car is ejected of the occupant being thrown out. Next, the turning of said shaft having turned the corresponding cam 6 sufficiently, the bolts $f$ of the adjoining closure $e$ are retracted so that the corresponding closure $e$ is released and it falls away and the springs 5 at the opposite side of the car eject the latter from the fuselage and clear of the plane and other parts of the aeroplane. Then the lost-motion afforded by slot 2 having been spent the spider hooks $y$ release the top-plate of the parachute at the side facing the direction of ejection of the car, allowing the top-plate to be driven from the side of the car by the springs 4 and the parachute to be opened by the extension of its spring ribs. (This operation is timed to occur instantaneously after the ejection of the car, so that the falling car may as soon as possible obtain the resistance to falling afforded by at least one of the parachutes). Finally, the lost-motion afforded by the slot-and-pin connection between the shafts 8 8 having been expended the motion is transmitted to the opposite shaft $r$ so as to cause its spider hooks *y* to release the top plate *m* of the other parachute, which now opens in the same way as the first. It will be understood that when either top plate *m* is released and clears the shaft the corresponding cam is driven off its shaft *r* and falls away. The disks 9, 10 are arranged with the pin on one midway of the slot in the other obviously so that lost-motion may be obtained whether one or the other of the shafts *r* is turned.

In descending, the occupant of the car can open the door *i* and release one of the parachutes or cut some of the guy ropes thereof so as to regulate the fall.

Having thus fully described my invention, what I claim as new and desire to secure by Letters Patent is:—

1. In combination, the fuselage of an aerial machine, a car to receive the occupant arranged therein and ejectable therefrom, a parachute attached to the car, and means, controllable by the occupant, to eject the car from the fuselage laterally thereof.

2. In combination, the hollow fuselage of an aerial machine having a lateral delivery opening, a car to receive the occupant arranged in the fuselage and ejectable therefrom through said opening, a parachute attached to the car, elastic means normally pressing the car toward the opening, and means, including a releasable closure for the opening, normally obstructing ejecting movement of said car.

3. In combination, the fuselage of an aerial machine, a car to receive the occupant arranged therein and ejectable therefrom in either of two opposite directions, a parachute attached to the car, and separate means, controllable by the occupant, to project the car from the fuselage, one of said means being adapted to eject the car in one of said directions and the other in the other direction.

4. In combination, the hollow fuselage of an aerial machine having a delivery opening, a car to receive the occupant arranged in the fuselage and ejectable therefrom through said opening, elastic means normally pressing the car toward the opening, means, including a releasable closure for the opening, normally obstructing ejecting movement of said car, and a folded parachute unfoldably packed between the car and said closure.

5. In combination, the hollow fuselage of an aerial machine having a delivery opening, a car to receive the occupant arranged in the fuselage and ejectable therefrom through said opening, elastic means normally pressing the car toward the opening, means, including a releasable closure for the opening, normally obstructing ejecting movement of said car, a parachute unfoldably packed between said car and a wall of the fuselage opposite said opening, and releasable means, operative from within the car, to maintain the parachute folded until the car clears the fuselage.

6. A parachute including, in combination, a flexible parachute cover, and a frame attached to the cover and consisting of radial spring ribs each normally adapted to extend but capable of being rolled toward its inner end into a helix and a center member to which said arms are affixed and from which they radiate.

In testimony whereof I affix my signature.

GUSTAVE KROGEL.